Patented Jan. 14, 1936

2,027,812

UNITED STATES PATENT OFFICE 2,027,812

A PROCESS FOR PREPARING BASIC TITANIC OXALATE

Sydney Francis William Crundall, Manchester, England, assignor to Peter Spence & Sons, Limited, Manchester, England No Drawing. Application April 6, 1932, Serial No. 603,678. In Great Britain April 14, 1931

2 Claims. (Cl. 260—11)

This invention has for its object the preparation of titanic oxalate.

In the preparation of titanium compounds such as are suitable for use, e. g., as pigments and for other purposes, it is already known to precipitate titanium hydroxide by hydrolysis, by heating to comparatively high temperatures its solutions in mineral acids, in the form of titanic acid, basic sulphates of titanium or mixtures of these. Now I have found that I may precipitate tetravalent titanium from mineral acid solutions under advantageous conditions and in a state of high purity in the form of basic oxalate; that the precipitated basic titanium oxalate so obtained is very suitable for use in the arts, as e. g., in the preparation of pigments and for other purposes, that its ratio of oxalic acid radicle to titanium may vary considerably according to the ratio of those constituents present in the mother solution, and other conditions and tends to be less when the precipitation takes place at higher temperatures; that I may precipitate the basic oxalate over a wide range of temperature, and that when precipitated in the cold or at not greatly higher temperatures it is readily soluble in e. g., dilute sulphuric acid, but that when precipitated at much higher temperatures, e. g., at or near the boiling point, it is only soluble in acids with difficulty. From a sulphate solution in the cold the basic titanium oxalate may be precipitated by the combined influences of partial neutralization, dilution and presence of oxalate radicle, and the order, and degree, in which these influences are applied may be varied, e. g., the oxalic acid or oxalate may be added first, the solution diluted, and lastly the neutralization performed, or this order of operation may be reversed. Particularly when the ratio of sulphate is high and that of oxalate is low the precipitate may also carry down some sulphate, but if made below e. g., 50° C. this can usually be washed out. Raising the temperature permits precipitation of basic oxalate from a more acid solution, but if made at considerably higher temperatures the precipitate is not only more difficult to dissolve in acids, but its contained sulphate then tends to be fixed which, generally, is not desired. By controlling the conditions e. g., with respect to dilution and also in such manner that precipitation takes place gradually, I am able to obtain the basic oxalate in finely granular form, easily settled, filtered and washed, and by regulating the degree of precipitation so that a little $TiO_2$ remains in solution I obtain a purer product than otherwise. From solutions consisting largely or entirely of titanium salts other than the sulphate, e. g., chloride, I am able to precipitate, e. g., in the cold, basic titanium oxalate from solutions which are much more acid than is possible under corresponding conditions with sulphate, and this increased acidity assists to maintain impurities in solution.

The following are examples of how I may carry my invention into effect.

*Example No. 1.*—I basicise a titanium sulphate solution, preferably with the iron contained in the titanium sulphate as an impurity in the ferrous state, at suitable concentration by adding a suitable base in sufficient quantity to obtain the maximum basicity technically practicable without immediate precipitation of titanic acid. I may, e. g., employ calcium carbonate, and where desired I may filter off and wash any precipitate e. g., calcium sulphate which may be thrown down. I may thus obtain a solution containing from about the equivalent of 0.5 to about 0.75 e. g., 0.6 to 0.7 molecule of $SO_3$ to one molecule of $TiO_2$. To the suitably diluted solution so obtained, which may contain e. g., 3% weight by volume $TiO_2$ (i. e., 3 grams of $TiO_2$ per 100 c. c. of solution) I then add oxalic acid in the proportion of e. g., from about 0.15 to about 0.3 mol. of oxalic acid to one mol. $TiO_2$, when I desire to obtain a very highly basic oxalate (or more oxalic acid when I desire a less basic product). The oxalic acid radical may be in the form of the free acid or as a suitable oxalate, e. g., barium or alkali oxalate, agitate and, if desired, warm and filter and wash the precipitated basic oxalate of titanium. When oxalic acid or a soluble oxalate is used, I prefer to add it in solution.

I may, if desired, have the required amount of oxalic acid present in the solution before effecting sufficient neutralization and/or dilution to bring about the separation of the basic oxalate, as in the following examples:—

*Example No. 2.*—To a cold titanic sulphate solution, preferably with the iron contained in the titanium sulphate as an impurity in the ferrous state, I add oxalic radicle in a suitable form as indicated in Example No. 1 and in quantity to give a ratio of e. g., 0.45 mol. oxalic acid to 1 mol. $TiO_2$ in the solution, dilute it to about 1.06 specific gravity and gradually add, under agitation, a cold solution of sodium carbonate diluted e. g., to about 1.06 specific gravity until a permanent precipitate appears, and thereafter slowly continue such addition until a test shows that most or nearly all of the $TiO_2$ has been precipitated. I then settle or filter and wash the precipitated product, which consists of basic titanic oxalate, and contains about 0.3 mol. oxalic acid to 1 mol. $TiO_2$. If I desire a higher ratio e. g., about 0.6 mol. oxalic acid in the product I add more oxalic acid, e. g., 0.8 to 1.0 mol., to the titanic sulphate solution before precipitation, or correspondingly less if I desire a lower ration product.

*Example No. 3.*—A cold titanic chloride solution, made e. g., by double decomposition between titanic sulphate and calcium chloride solutions, containing 3 grams $TiO_2$ per 100 c.c. and hydrochloric acid equivalent to about 1.4 mols. HCl to 1 mol. $TiO_2$, and 0.8 mol. of free oxalic acid in crystal form to 1 mol. $TiO_2$, under agitation. After 2 or 3 hours and without further neutralization a test showed that about 75% of the $TiO_2$ had been precipitated as basic titanic oxalate. It was filtered, washed with cold water, and then contained nearly 0.6 mol. oxalic acid to 1 mol. $TiO_2$. Even with much more hydrochloric acid present the basic oxalate is still precipitated under these conditions but in smaller quantity and with a lower ratio of oxalic acid to $TiO_2$. Conversely the yield is increased by neutralizing the solution further. The presence of sulphate radicle tends to prevent precipitation in the absence of further neutralization. More highly basic oxalates containing e. g. as low as 0.1 to 0.2 mol. oxalic acid can be obtained in like manner if the titanic chloride solution receives correspondingly less oxalic acid.

*Example No. 4.*—A solution containing 2 grams $TiO_2$ per 100 c. c. and 0.92 mol. oxalic acid, 0.53 mol. $SO_3$ and total acid, including chloride, available for the $TiO_2$, equivalent to 3.7 mols. dibasic acid, was boiled for ½ hour. Almost all the $TiO_2$ was precipitated as substantially a basic oxalate. It was granular, readily filterable and after being washed contained 0.26 mol. oxalic acid and 0.012 mol. $SO_3$ to 1 mol. $TiO_2$.

The precipitate so obtained consists essentially of a basic oxalate of titanium. It may be purified by treatment with very dilute mineral or organic acid solutions under conditions which do not effect solution of the titanic acid in appreciable degree. I may effect the precipitation of the basic oxalate in the presence of an extender, e. g., $BaSO_4$ or $CaSO_4$, which may be added as such or produced in part by the reaction between the titanium sulphate solution and the base or the oxalate used, e. g., barium carbonate, barium oxalate etc., and I may further modify and control the character of the precipitate and its behaviour under filtration etc. by the addition of sodium chloride to the solution prior to precipitation.

The basic titanium oxalate, particularly that produced at lower temperatures, may be dissolved in e. g., sulphuric or oxalic acids, and neutral sulphate or oxalate may also be added, to give solutions of technical value, or the basic oxalate may be treated with a suitable alkali, e. g., sodium carbonate, whereby the oxalate radicle is dissolved and may be re-used, and a high quality titanium hydroxide produced. The latter, if produced from the readily acid-soluble basic oxalate and not over heated is itself readily soluble in acids. Either the basic oxalate or the hydroxide, mixed or not with other suitable materials, may be dried and calcined by known means for the preparation of pigments.

What I claim as my invention and desire to secure by Letters Patent is:—

1. The process for preparing basic titanic oxalate which includes the steps of forming a solution of titanium in a mineral acid, the solution having approximately 0.6 molecules of acid, expressed as $SO_3$, for each molecule of $TiO_2$, adding to the solution approximately 0.2 molecules of oxalic acid for each molecule of $TiO_2$ and diluting the solution to precipitate basic titanic oxalate, the solution being maintained at a temperature below 50° C.

2. The process for preparing basic titanic oxalate which includes the step of forming a solution of titanium sulphate having a ratio of approximately 0.6 molecules of $SO_3$ for each molecule of $TiO_2$, neutralizing the titanium sulphate solution, adding to the solution oxalic acid in a ratio of approximately 0.2 molecules for each molecule of $TiO_2$, diluting the solution to precipitate titanic oxalate, the temperature of the solution being maintained below 50° C.

SYDNEY FRANCIS WILLIAM CRUNDALL.